US012592868B2

(12) United States Patent
Singhal

(10) Patent No.: US 12,592,868 B2
(45) Date of Patent: Mar. 31, 2026

(54) SEAMLESS SCALE DOWN OF MICRO-SERVICES RUNNING OVER SCTP PROTOCOL

(71) Applicant: Parallel Wireless, Inc., Nashua, NH (US)

(72) Inventor: Mukesh Singhal, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 18/663,061

(22) Filed: May 13, 2024

(65) Prior Publication Data

US 2024/0414070 A1      Dec. 12, 2024

Related U.S. Application Data

(60) Provisional application No. 63/502,083, filed on May 13, 2023.

(51) Int. Cl.
H04L 41/40 (2022.01)
H04L 41/5054 (2022.01)

(52) U.S. Cl.
CPC .......... H04L 41/40 (2022.05); H04L 41/5054 (2013.01)

(58) Field of Classification Search
CPC ........................... H04L 41/40; H04L 41/5054
See application file for complete search history.

(56) References Cited

U.S. PATENT DOCUMENTS

| | | | |
|---|---|---|---|
| 9,900,407 B2 | 2/2018 | Mishra et al. | |
| 10,595,242 B2 | 3/2020 | Rao et al. | |
| 10,798,631 B2 | 10/2020 | Agarwal et al. | |
| 10,959,275 B2 | 3/2021 | Mishra et al. | |
| 11,165,859 B1 * | 11/2021 | Eckman .............. | H04L 67/1029 |
| 2014/0149590 A1 * | 5/2014 | Mallipeddi ........... | G06F 9/5061 |
| | | | 709/226 |
| 2024/0236766 A1 | 7/2024 | Shete et al. | |
| 2024/0259879 A1 | 8/2024 | Ranganath et al. | |

* cited by examiner

*Primary Examiner* — Tonia L Dollinger
*Assistant Examiner* — Joseph M Cousins
(74) *Attorney, Agent, or Firm* — Michael Y. Saji

(57) ABSTRACT

Systems and methods are provided for telecom cloud scale down. In one embodiment, a method is provided comprising: deploying a coordinating node, which may be a CU-CP or CU-UP, in a microservices cloud infrastructure; receiving, at an internal controller at the coordinating node, a trigger request for scale down preparation; sending, from the internal controller, a scale down request to a first stateful telecom microservice; sending, from the first stateful telecom microservice, at least one existing session state distribution request to at least one additional stateful telecom microservice; distributing existing connection and session information to the at least one additional stateful telecom microservice; and sending, from the first stateful telecom microservice to the internal controller, a scale down preparation completion message, thereby performing telecom cloud scale down while mitigating disruptions to subscriber service. The method may further comprise terminating the first stateful telecom microservice.

3 Claims, 5 Drawing Sheets

SEAMLESS SCALE DOWN OF MICRO-SERVICES RUNNING OVER SCTP PROTOCOL

CROSS-REFERENCE TO RELATED APPLICATIONS

This application claims the benefit of priority under 35 U.S.C. § 119(e) to U.S. Provisional Application No. 63/502, 083, filed May 13, 2023, and having the title "Seamless Scale down of F1-APP/E1-APP/NGAP/XnApp/X2-App/ E2-App micro-services running over SCTP protocol," which is hereby incorporated by reference in its entirety for all purposes.

In addition, the following patent publication documents are incorporated by reference in their entirety for all purposes: U.S. Pat. Pub. Nos. US20230205752A1, US20230208704A1, US20230229428A1, US20230291646A1, US20230344708A1, US20230370872A1.

BACKGROUND gNB-CU-CP and gNB-CU-UP are two network elements that are part of the 5G architecture. gNB-CU-CP handles control plane functions for the gNB (5G nodeB), including radio resource management, connection establishment, mobility management, and signaling. gNB-CU-CP communicates with gNB-DUs (Distributed Units) and performs centralized control functions for multiple gNB-DUs. It can be located in a central data center or network facility, or depending on the RAN deployment architecture, may be located closer to the RAN.

Similarly, gNB-CU-UP handles user plane functions for the gNB, including user plane traffic, packet routing, forwarding, data processing. A single gNB-CU-UP may handle user plane functions for multiple gNBs. The gNB-CU-UP can be located in a central data center or network facility, or depending on the RAN deployment architecture, may be located closer to the RAN.

In today's context, Public/private cloud infrastructure should provide support for scale down. However, scale down operation for quasi-stateful/stateful application cannot be done in isolation by Public cloud/private cloud entity else this would result into service disruption for subscriber connected via specific micro-service in gNB-CU-CP/gNB-CU-UP.

SUMMARY

Scaling down of gNB-CU-CP/gNB-CU-UP micro-services is desirable without service disruption to end user in 5G network. To provide this functionality, the present disclosure provides a number of embodiments.

In a first embodiment, a method for telecom cloud scale down is disclosed, the method comprising: receiving, at an internal controller at a coordinating node, a trigger request for scale down preparation; sending, from the internal controller, a scale down request to a first stateful telecom microservice; sending, from the first stateful telecom microservice, at least one existing session state distribution request to at least one additional stateful telecom microservice; distributing existing connection and session information to the at least one additional stateful telecom microservice; and sending, from the first stateful telecom microservice to the internal controller, a scale down preparation completion message, thereby performing telecom cloud scale down while mitigating disruptions to subscriber service.

The method may further comprise deploying the coordinating node in a microservices cloud infrastructure. The coordinating node may be a CU-CP or CU-UP. The method may further comprise terminating the first stateful telecom microservice.

DETAILED DESCRIPTION

Containers and Pods

A pod is a group of one or more containers, with shared storage and network resources, and a specification for how to run the containers. A pod's contents are always co-located and co-scheduled, and run in a shared context. A pod models an application-specific "logical host": it contains one or more application containers which are relatively tightly coupled. In non-cloud contexts, applications executed on the same physical or virtual machine are analogous to cloud applications executed on the same logical host. If any of the data-plane pods crashes which will result into loss of subscriber data-session and end to end connectivity.

In some embodiments, one or more network functions as described herein may be provided by virtualized servers, which may be provided using containerization technology. Containers decouple applications from underlying host infrastructure. This makes deployment easier in different cloud or OS environments. A container image is a ready-to-run software package, containing everything needed to run an application: the code and any runtime it requires, application and system libraries, and default values for any essential settings. Containers may include the use of Kubernetes or other container runtimes.

In Kubernetes, A pod (as in a pod of whales or pea pod) is a group of one or more containers, with shared storage and network resources, and a specification for how to run the containers. A Pod's contents are always co-located and co-scheduled, and run in a shared context. A Pod models an application-specific "logical host": it contains one or more application containers which are relatively tightly coupled. In non-cloud contexts, applications executed on the same physical or virtual machine are analogous to cloud applications executed on the same logical host. Pods are configured in Kubernetes using YAML files.

For example, a controller for a given resource provided using containers handles replication and rollout and automatic healing in case of Pod failure. For example, if a Node fails, a controller notices that Pods on that Node have stopped working and creates a replacement Pod. The scheduler places the replacement Pod onto a healthy Node.

The use of containerized technologies is rapidly spreading for providing 5G core (5GC) technologies. The present disclosure is deployed using containerized technologies, in some embodiments.

Further details regarding some embodiments may be found in U.S. Pat. App. Publication Nos. US20230063162A1, US20230075944A1, and US20220400424A1, each of which are hereby incorporated by reference in their entirety for all purposes.

Figure 1:
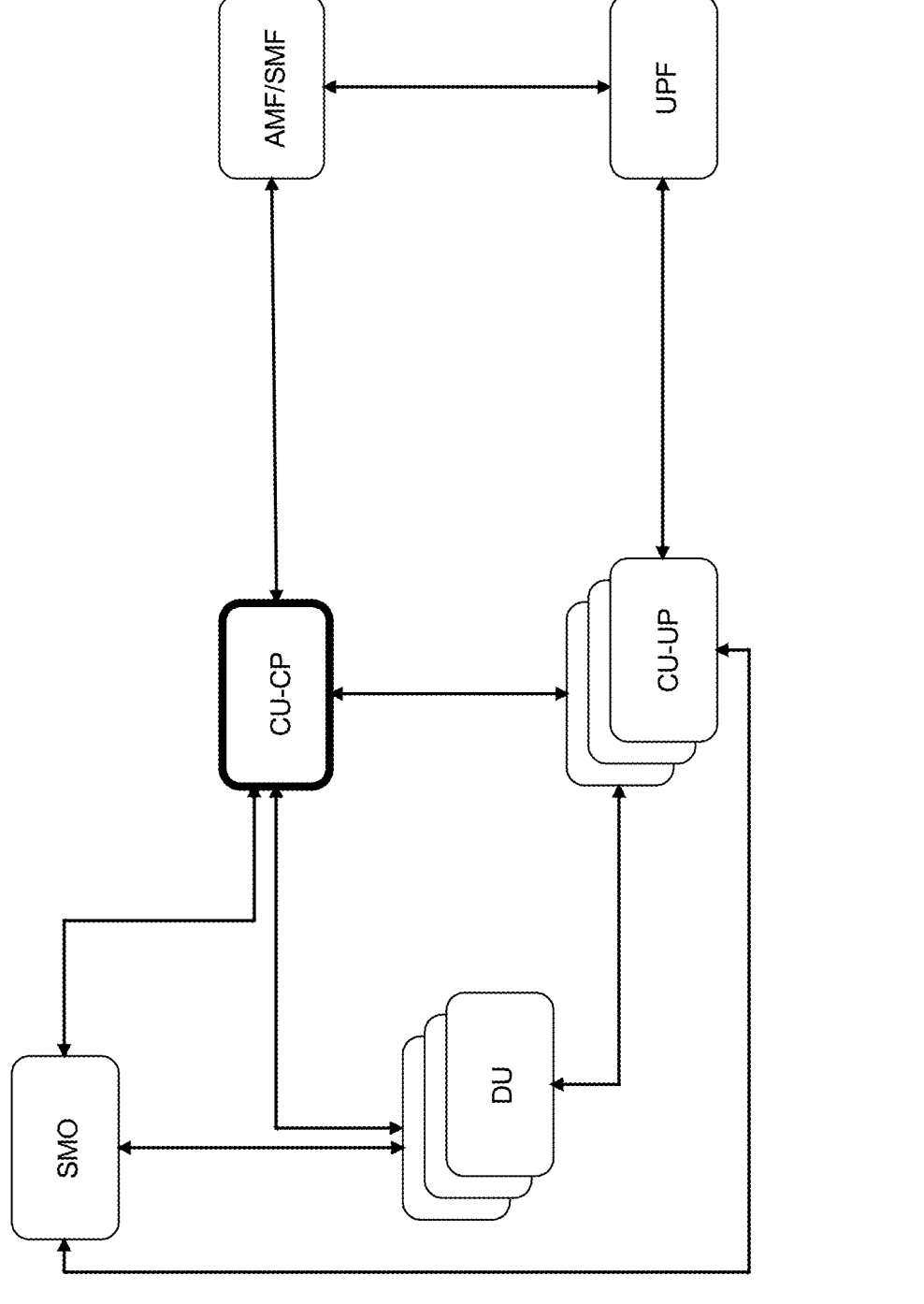
FIG. 1 is a schematic drawing of a telecommunications network showing the role of a CU-UP and CU-CP, in accordance with some embodiments.

FIG. 1 is a schematic drawing of a telecommunications network showing the role of a CU-UP and CU-CP, in accordance with some embodiments.

CU-CP: This node handles RRC and the control plane part of the PDCP protocol. This node communicates with DU over F1-C interface and with CU-UP over E1 interface as defined in 3GPP specifications.

CU-UP/s: This node handles user plane part of PDCP protocol and SDAP protocol. It communicates with CU-CP over E1 interface and with DU over F1-U interface.

SMO stands for Service management and orchestration.

SMO is responsible for orchestration and management of gNB-CU-UP, gNB-CU-CP & DU node.

It is in control of infra structure component like CPU/ Memory and scale up and scale down operations, as well as FCAPS (Fault, Configuration, Security, Performance, Accounting) management of Open-RAN elements (gNB-CU-CP, gNB-CU-UP, gNB-DU).

AMF/SMF is the 3GPP defined 5G core network element for control signaling.

UPF is the 3GPP defined 5G core network element for data-plane traffic.

DU (gNB-DU) is the 3GPP defined 5G access network element.

Some additional terms are explained below.

E1-Micro-service is the internal Micro-service in CU-UP cluster to handle SCTP+E1-APP interface signaling with gNB-CU-CP. E1-APP & SCTP connections terminates at E1-micro-service. This micro-service can have multiple E1 pods to handle high signaling load.

NGAP-Micro-service is the internal Micro-service in CU-CP cluster to handle SCTP+NGAP-APP interface signaling with AMF. NGAP-APP & SCTP connections terminates at NGAP-micro-service. This micro-service can have multiple pods to handle high signaling load.

F1-App/F1-Micro-service is the internal Micro-service in CU-CP cluster to handle SCTP+F1-App/F1-APP interface signaling with DU. F1-App/F1-APP & SCTP connections terminates at F1-App/F1-micro-service. This micro-service can have multiple pods to handle high signaling load.

Xn/X2-Micro-service is the internal Micro-service in CU-CP cluster to handle SCTP+Xn/X2-APP interface signaling with 5G/4G-CU. Xn/X2-APP & SCTP connections terminate at Xn/X2-micro-service.

Internal controller keeps track of health of all pods & micro services in a given namespace. As soon as any pod/container crashes, it updates the remaining pods. And takes necessary steps to bring system in workable state.

Figure 2:
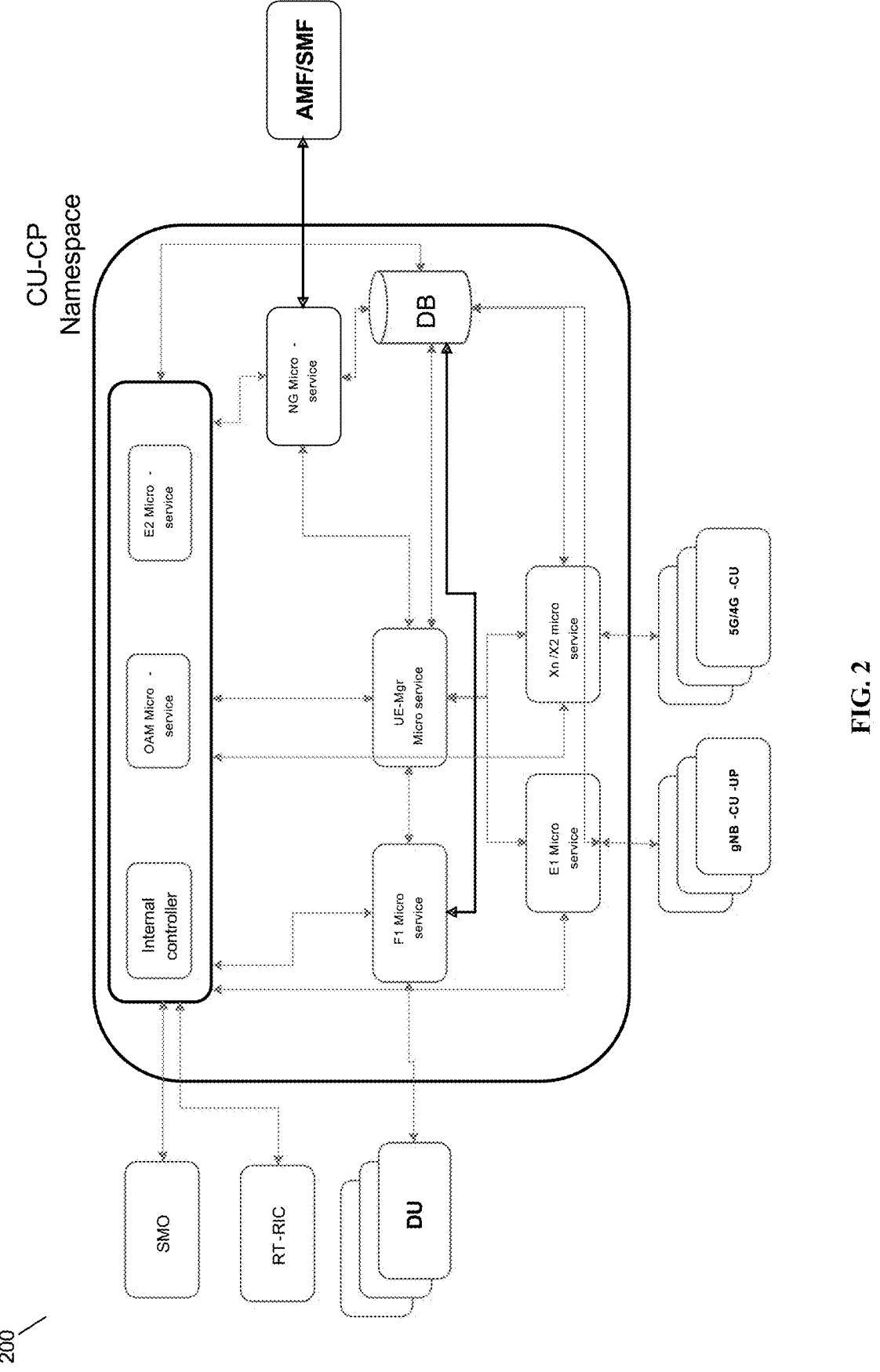
FIG. 2 is a schematic drawing of a gNB-CU-CP internal logical architecture, in accordance with some embodiments.

FIG. 2 is a schematic drawing of a gNB-CU-CP internal logical architecture, in accordance with some embodiments. There are multiple micro-services and pods in single gNB-CU-CP. Depending on deployment requirement most of the micro-service can utilize multiple pods for scaling purpose.

Figure 3:
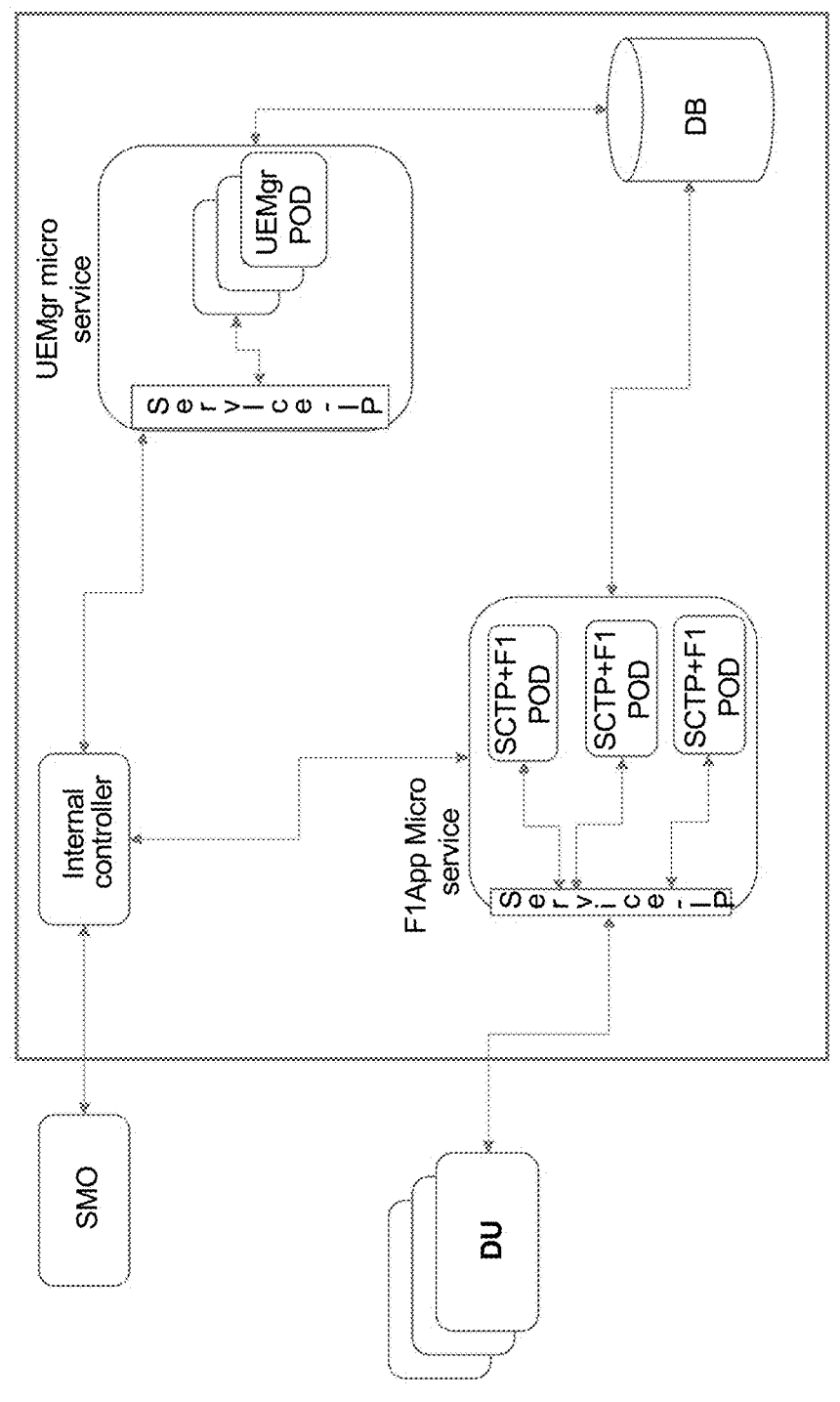
FIG. 3 is a schematic drawing of a gNB-CU-CP internal logical architecture showing F1 and UE manager (UEmgr) micro services, in accordance with some embodiments.

FIG. 3 is a schematic drawing of a gNB-CU-CP internal logical architecture showing F1 and UEmgr micro services, in accordance with some embodiments.

Starting with the F1 micro-service, there is a significant amount of state that is tracked by the F1 micro-service for each gNB and for each UE.

Since there is stateful/quasi-stateful behaviour required by the protocols in gNB-CU-CP, as state is also maintained by peer nodes & end subscribers, depending on protocol termination points. Some of this state is handled by the UEmgr micro-service.

UEmgr micro-service is a micro-service that tracks individual UEs. Each pod tracks one or more UEs and their state, including mobility state and where the UE is attached.

Unexpected killing of any pod in any micro-service may result into service disruption if scale down is not done in a graceful manner for CU-UP & CU-CP micro services. This is because each pod uses the pod address of another micro-service to perform its own individual functions. If a pod is killed, the pods which rely upon it may encounter errors or fail to function.

Figure 4:
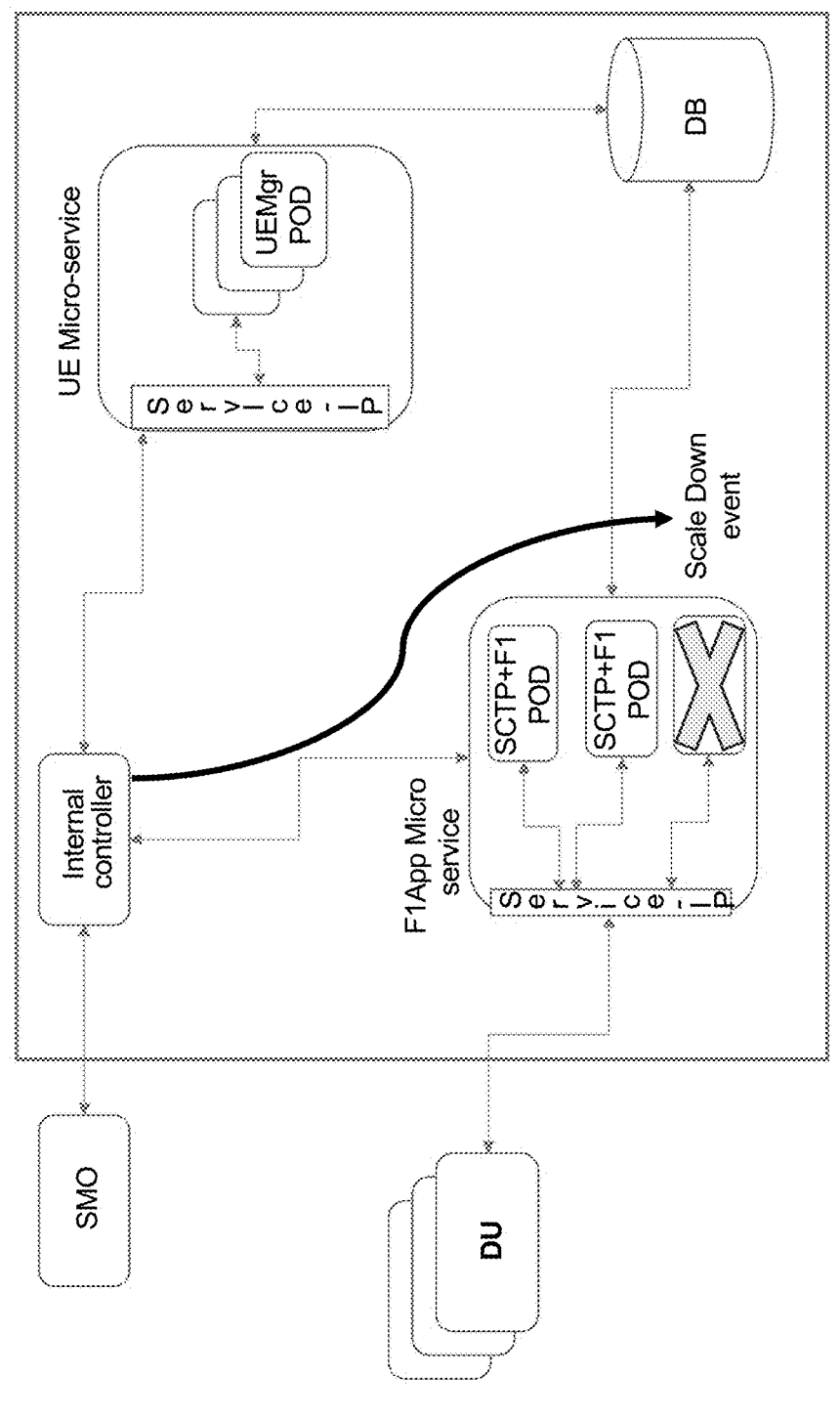
FIG. 4 is a schematic drawing showing scale down of an F1 micro service, in accordance with some embodiments.

FIG. 4 is a schematic drawing showing scale down of an F1 micro service, in accordance with some embodiments. Scale Down trigger from SMO to F1-Micro-service is performed as follows. In operation, the following steps may be performed. SMO sends scale down preparation trigger to internal controller. Subsequently, the internal Controller inform to one of the F1 pod/Task for scale down & inform all other pods about F1 pod going to scale down operation (Scale down request). Subsequently, the F1 pod/Task distribute existing connection & session information to remaining F1 pods (session state distribution request). Subsequently, the F1 pod Inform internal controller for ready for scale down. Subsequently, Other F1 pods re-establishes connection with peer node. Update the database with changed information of connection and sessions. Subsequently, the internal controller informs SMO scale down preparation complete with pod information. Subsequently, the SMO takes necessary action to bring down F1 pod selected by internal controller.

Figure 5:
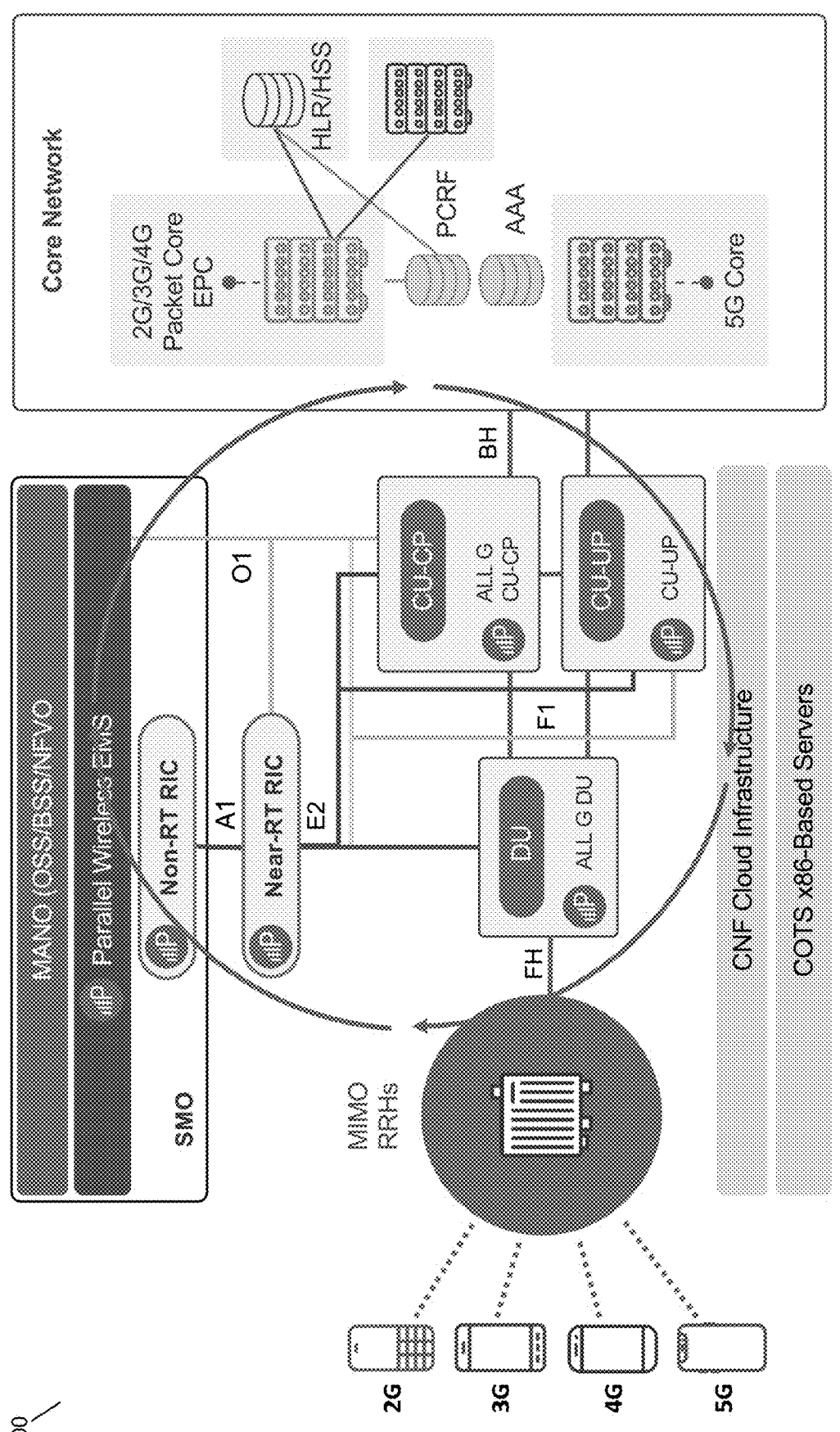
FIG. 5 is a schematic diagram of a multi-RAT RAN deployment architecture, in accordance with some embodiments.

FIG. 5 is a schematic diagram of a multi-RAT RAN deployment architecture, in accordance with some embodiments. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT RIC is capable of interoperating with not just 5G but also 2G/3G/4G.

The all-G near-RT RIC may perform processing and network adjustments that are appropriate given the RAT. For example, a 4G/5G near-RT RIC performs network adjustments that are intended to operate in the 100 ms latency window. However, for 2G or 3G, these windows may be extended. As well, the all-G near-RT RIC can perform configuration changes that takes into account different network conditions across multiple RATs. For example, if 4G is becoming crowded or if compute is becoming unavailable, admission control, load shedding, or UE RAT reselection may be performed to redirect 4G voice users to use 2G instead of 4G, thereby maintaining performance for users.

As well, the non-RT RIC is also changed to be a near-RT RIC, such that the all-G non-RT RIC is capable of performing network adjustments and configuration changes for individual RATs or across RATs similar to the all-G near-RT RIC. In some embodiments, each RAT can be supported using processes, that may be deployed in threads, containers, virtual machines, etc., and that are dedicated to that specific RAT, and, multiple RATs may be supported by combining them on a single architecture or (physical or virtual) machine. In some embodiments, the interfaces between different RAT processes may be standardized such that different RATs can be coordinated with each other, which may involve interworking processes or which may involve supporting a subset of available commands for a RAT, in some embodiments.

Additional Embodiments

In any of the scenarios described herein, where processing may be performed at the cell, the processing may also be performed in coordination with a cloud coordination server. A gNodeB may be a mesh node or may be an eNodeB. An gNodeB may be in communication with the CU-CP via an F1 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods are described in reference to 5G, one of skill in the art would understand that these systems and methods could be adapted for use with other wireless standards or versions thereof, including particularly 4G, or 2G deployed on a similar core network infrastructure.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 or ARM microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality. Where the term "all-G" is used herein, it is understood to mean multi-RAT (having at least two radio access technologies).

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for telecom cloud scale down, the method comprising:

deploying a coordinating node in a microservices cloud infrastructure;

receiving, at an internal controller at the coordinating node, a trigger request for scale down preparation;

sending, from the internal controller, a scale down request to a first stateful telecom microservice;

sending, from the first stateful telecom microservice, at least one existing session state distribution request to at least one additional stateful telecom microservice;

distributing existing connection and session information to the at least one additional stateful telecom microservice; and sending, from the first stateful telecom microservice to the internal controller, a scale down preparation completion message, thereby performing telecom cloud scale down while mitigating disruptions to subscriber service.

2. The method of claim 1, wherein the coordinating node is a CU-CP or CU-UP.

3. The method of claim 1, further comprising terminating the first stateful telecom microservice.

\* \* \* \* \*